(12) United States Patent
Stuber et al.

(10) Patent No.: US 6,912,609 B2
(45) Date of Patent: Jun. 28, 2005

(54) FOUR-PHASE HANDSHAKE ARBITRATION

(75) Inventors: Russell B. Stuber, Boulder, CO (US); Christopher M. Giles, Lafayette, CO (US); David O. Sluiter, Superior, CO (US)

(73) Assignee: LSI Logic Corporation, Milpitas, CA (US)

( * ) Notice: Subject to any disclaimer, the term of this patent is extended or adjusted under 35 U.S.C. 154(b) by 381 days.

(21) Appl. No.: 10/328,618

(22) Filed: Dec. 24, 2002

(65) Prior Publication Data

US 2004/0123005 A1 Jun. 24, 2004

(51) Int. Cl.[7] .............................................. G06F 13/00
(52) U.S. Cl. ..................... 710/107; 710/109; 710/110; 710/220; 710/309; 711/151
(58) Field of Search ................................ 710/107–109, 710/200, 220, 240–244, 110, 112, 11, 309; 711/147–153

(56) References Cited

U.S. PATENT DOCUMENTS

| | | | | |
|---|---|---|---|---|
| 5,682,467 A | * | 10/1997 | Ambalavanar | 358/1.15 |
| 5,805,838 A | * | 9/1998 | Sutherland et al. | 710/112 |
| 5,923,859 A | * | 7/1999 | Melo et al. | 710/113 |
| 6,259,984 B1 | * | 7/2001 | Kanzaki et al. | 701/51 |
| 6,430,651 B1 | * | 8/2002 | Isobe | 711/104 |

* cited by examiner

Primary Examiner—Paul R. Myers
Assistant Examiner—Raymond N Phan
(74) Attorney, Agent, or Firm—Westman, Champlin & Kelly

(57) ABSTRACT

A four-phase arbitration system employs a master and a slave arbiter. The master arbiter operates to provide ownership of a bus to a first device if a second device, coupled to the slave arbiter is not conducting a transaction. If the second device desires use of the bus, the slave arbiter sends a request to the master arbiter, which asserts an acknowledge signal for as long as the first device has ownership of the bus, and at least as long as a timeout of the first device. The master arbiter de-asserts its acknowledge signal when the first device ceases ownership of the bus. The slave arbiter is responsive to the de-assertion of the acknowledge signal to assert bus ownership to the second device. When the second device transaction is completed, its request signal is de-asserted to the master arbiter, causing the master arbiter to re-assert the acknowledge signal. Failure to receive a de-asserted acknowledge signal causes the slave arbiter to move to the next state.

18 Claims, 2 Drawing Sheets

FOUR-PHASE HANDSHAKE ARBITRATION

CROSS-REFERENCE TO RELATED APPLICATIONS

This application is related to Application No. (02-5806/L13.12-0231), for "Process and Apparatus for Managing use of a Peripheral Bus among a Plurality of Controllers" filed on even date herewith by R. Stuber, D. Sluiter and C. Giles.

FIELD OF THE INVENTION

This invention relates to data communications, and particularly to managing communications between plural master devices and at least one peripheral device.

BACKGROUND OF THE INVENTION

Data buses are used in integrated circuits (ICs) to transfer data between termination devices within the IC. Usually, one or more of the termination devices is, or is coupled to, a user-controlled device such as a microprocessor and operates as a control device. Another termination device is, or is coupled to, a peripheral device, such as an on-chip or off-chip memory or the like, and operates as a controlled device. For example, an IC might include a microprocessor coupled through a main bus to a bus slave that operates or controls a peripheral controller and/or peripheral device. If the peripheral device is an off-chip device, such as an off-chip memory, the peripheral controller may be on the same chip as the bus slave, and a peripheral bus provides control and data communications between the off-chip peripheral device and the on-chip peripheral controller.

Ordinarily, a single peripheral device is controlled by a single controller through a peripheral bus. Consequently, the peripheral controller is often included on the same IC chip as the bus slave. If it is desired to add a second termination device to control the peripheral device, it may be accomplished by adding another IC chip containing the second termination device (bus slave, for example) and a second peripheral controller. Under such circumstances, the second peripheral controller would also coupled to the peripheral bus. Thus, an off-chip memory would be coupled by a peripheral bus to several peripheral controllers on different IC chips, each peripheral controller being coupled to a different master device, such as through a respective bus slave and main bus. To avoid conflict between the plural peripheral controllers' operation of the peripheral device, it is necessary to arbitrate use of the peripheral bus among the several peripheral controllers, allowing one or another peripheral controller access to the peripheral bus.

There is a need for a system that arbitrates use of a single-device bus among plural devices.

SUMMARY OF THE INVENTION

The present invention concerns arbitration of use of a bus between the several devices to assign bus ownership to one device. First and second arbiters supply the respective first and second ownership signals to the respective devices. The second arbiter is a slave arbiter and is operated to assert a request signal when a second master device is ready to conduct a data transfer transaction with a peripheral device. The first arbiter is responsive to the asserted request signal to assert a first acknowledge signal, and to de-assert the acknowledge signal when the first arbiter no longer "owns" the bus. The second arbiter is responsive to the de-asserted first acknowledge signal to assert the second ownership signal. The second arbiter is responsive to completion of a data transfer transaction by the second master device to de-assert the ready and second ownership signals.

DETAILED DESCRIPTION OF THE PREFERRED EMBODIMENTS

As used herein, a "master device" is apparatus that controls a "slave device" to perform transactions between the master device and a peripheral device coupled to the slave device. As used herein, a "master device" may include a bus slave that itself receives control signals from one or more microprocessors via a main bus to control operation of a peripheral device. In such a case, the "master device" includes the microprocessor(s), main bus and bus slave of the main bus system. As used herein, a "slave device" includes a controller, such as a memory controller, coupled to a master device (i.e., a bus slave), and is operable to control the peripheral device, such as an on-chip or off-chip memory. Plural master devices may be coupled to respective slave devices to operate a common peripheral device. Thus, any master device may conduct a transaction though its respective peripheral controller with the peripheral device.

Figure 1:
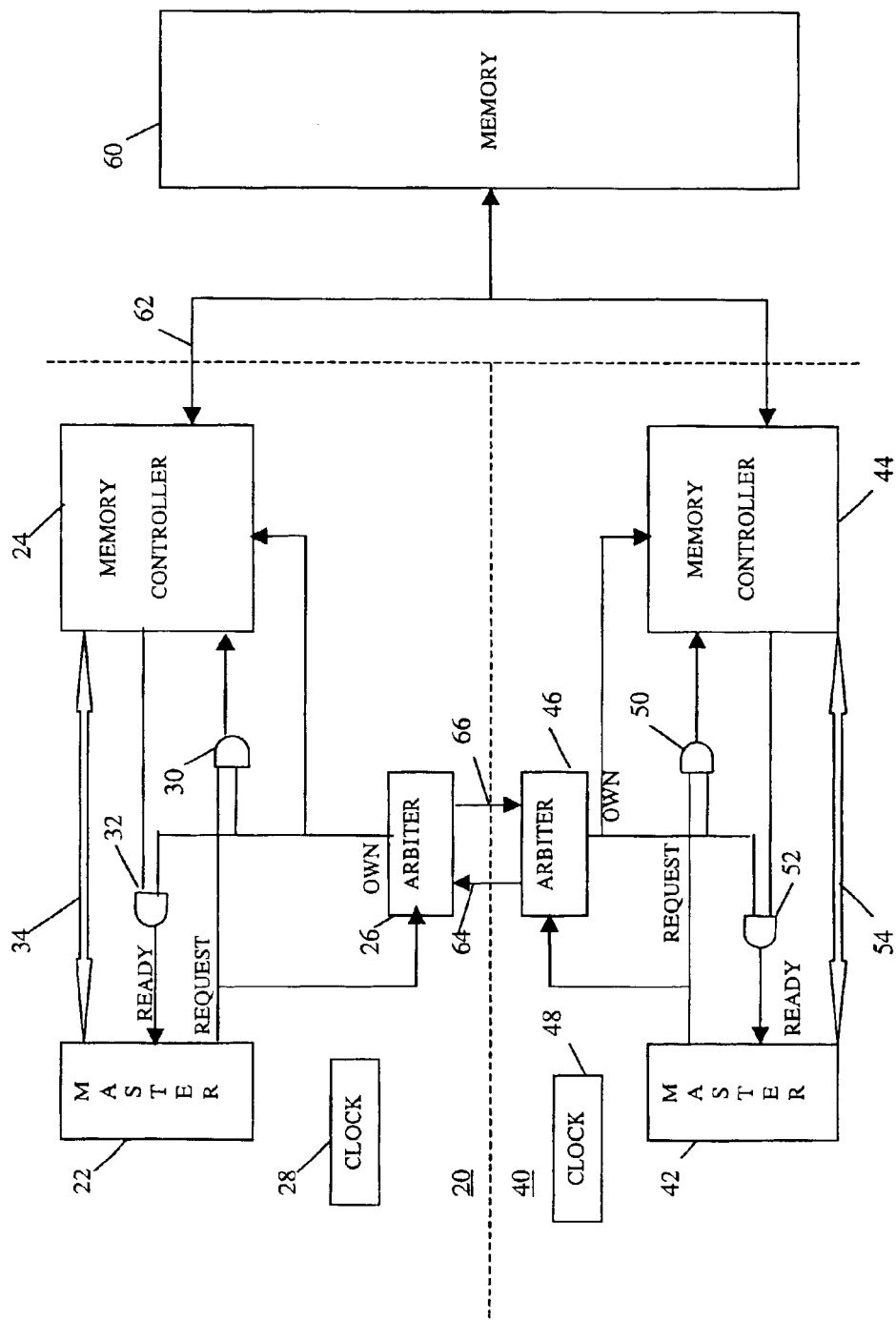
FIG. 1 is a block diagram of a communication control system using an arbitration protocol in accordance with an embodiment of the present invention.

FIG. 1 illustrates a communication system which includes an arbitration system according to the present invention. A first integrated circuit chip 20 includes master device 22, memory controller 24 and arbiter 26 all operating at a clock frequency established by clock 28. Master device 22 provides request signals through gate 30 to memory controller 24 and receives ready signals from memory controller 24 through gate 32. Arbiter 26 provides an ownership signal to gates 30 and 32 and memory controller 24. Master device 22 also provides request signals to arbiter 26.

Similarly, a second IC chip 40 includes master device 42, memory controller 44 and arbiter 46 all operating under control of clock 48. Master device 42 provides request signals to arbiter 46 and through gate 50 to memory controller 44, and master device 42 receives ready signals from memory controller 44 through gate 52. Arbiter 46 receives request signals from master device 42 and provides ownership signals to gates 50 and 52, and memory controller 44.

Data are transferred between master device 22 and memory controller 24 via data bus 34, and data are transferred between master device 42 and memory controller 44 via data bus 54. Memory controllers 24 and 44 are coupled to memory 60 via peripheral bus 62. Each memory controller 24 and 44 tri-states to operate in active states with high and low signals (ones and zeros) on bus 62, or in an idle state to appear as a high-impedance device to bus 62. In the active state, the memory controller can transfer data (send and receive) between its master device and memory 60 via peripheral bus 62; in the idle (high-impedance) state, the memory controller will not adversely affect a transaction between memory 60 and a different controller.

One of the arbiters, such as arbiter 46, is designated a slave arbiter, and asserts request signals via line 64 to the other arbiter, namely arbiter 26, which is designated a master arbiter. The master arbiter 26 asserts acknowledge signals to slave arbiter 46 via line 66. The designation of one or the other of the arbiters as master or slave is arbitrary, although whether an arbiter is a master or slave arbiter affects the protocol of the master/controller pair's access to peripheral bus 62.

Clocks 28 and 48 provide cyclic clock signals to the elements on their respective ICs 20 and 40. The clock frequencies supplied by clocks 28 and 48 are preferably, but not necessarily, the same. Therefore, the devices on IC 20 may operate at a different clock frequency from the devices on IC 40. Moreover, memory 60 might operate at a different clock frequency from either clock 28 or 48, so memory controllers 24 and 44 may transfer data with memory 60 at the clock frequency of the memory and transfer data with their respective master devices 22 or 42 at the clock frequency of the respective clock 28 or 48.

In the operation of the apparatus illustrated in FIG. 1, one or the other of arbiters 26 and 46 asserts an ownership signal to the respective gates on that chip. The master device and memory controller on that chip operate in a normal manner. Thus, if arbiter 26 asserts an ownership signal to gates 30 and 32, a request signal from master 22 passes through gate 30 to operate memory controller 24 for use of peripheral bus 62 to conduct a transaction with memory 60. Similarly, a ready signal indicating that memory controller 24 is in a ready state passes through gate 32 to master device 22. Moreover, the asserted ownership signal operates memory controller 24 to an active state to conduct the transaction with memory 60 and thereby send and receive data via peripheral bus 62. Hence, master device 22 and memory controller 24 have "ownership" of peripheral bus 62 to memory 60.

Only one arbiter can assert ownership at any given time. Therefore, if arbiter 26 is asserting ownership to IC 20, arbiter 46 will not assert ownership to IC 40. Consequently, gates 50 and 52 are not enabled, and request signals from master device 42 are blocked by gate 50 from memory controller 44 and ready signals from memory controller 44 are blocked from master device 42. Consequently, master device 42 appears to be idle (making no requests) to memory controller 44, and memory controller 44 appears to be busy to master device 42. Moreover, memory controller 44 is responsive to the de-asserted ownership signal from arbiter 46 to operate to a high-impedance state so that it does not interfere with another controller's transactions with memory 60 via peripheral bus 62. Thus, the de-asserted ownership signal to gate 50 blocks master device 42 from use of peripheral bus 62, and the de-asserted ownership signal to gate 52 makes peripheral bus 62 appear busy to master device 42. Consequently, master device 42 will not transmit to memory controller 44 and the memory controller 44 will not look to master device 42 for data or control.

In accordance with the present invention, arbiters 26 and 46 operate to assign ownership of peripheral bus 62 to one or the other of master/controller pairs. In the example, arbiter 26 is a "master" arbiter and, if arbiter 46 does not currently "own" the bus, will respond to a request from master device 22 to assert an ownership signal to gates 30 and 32 and peripheral device 24, assigning ownership of peripheral bus 62 to master device 22 and memory controller 24. Consequently, arbiter 26 normally provides ownership signals gates 30 and 32. Arbiter 46 is a "slave" arbiter and will assert ownership signals to gates 50 and 52 and memory controller 44 if arbiter 26 does not "own" the bus.

In the event that master device 42 desires to gain access to peripheral bus 62 through memory controller 44, a request signal asserted by master device 42 is applied to arbiter 46 and gate 50. As previously described, gate 50 is not enabled, so the request signal is blocked from reaching memory controller 44. Arbiter 46 is responsive to the asserted request signal from master device 42 to assert a request to arbiter 26. If master device 22 has not asserted a request to arbiter 26, the ownership signal is de-asserted by arbiter 26 to gates 30 and 32 and memory controller 24. Arbiter 26 responds to the request signal to assert an acknowledge signal to arbiter 46. If arbiter 26 does not "own" bus 62, the acknowledge signal is de-asserted to operate arbiter 46 to assert an ownership signal to gates 40 and 52 and memory controller 44. Consequently, chip 40 is accorded ownership of peripheral bus 62 to the exclusion of chip 20.

If master device 22 had already asserted a request to arbiter 26 when master device 42 asserts its request to arbiter 46 (e.g., master device 22 is conducting a transaction with memory 60), arbiter 26 will not de-assert ownership to gates 30 and 32, nor de-assert the acknowledgement to arbiter 46, so chip 20 is denied ownership of bus 62. Consequently, arbiter 46 continues to de-assert ownership to chip 40.

Figure 2:
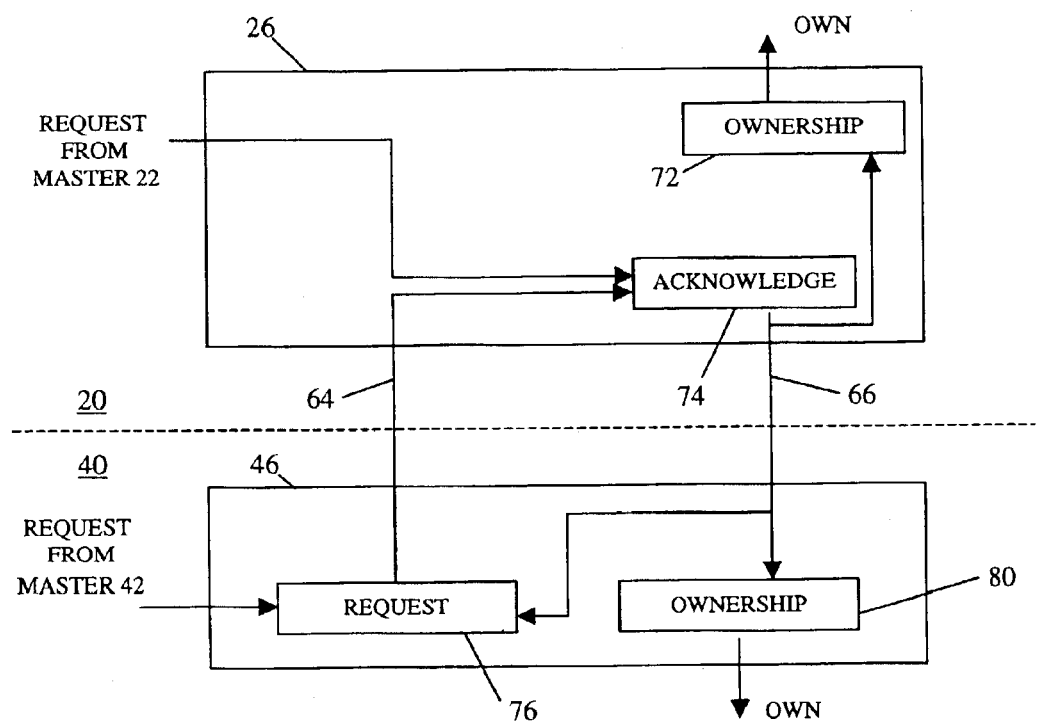
FIG. 2 is a function diagram of master and slave arbiters in accordance with the present invention.
Figure 3:
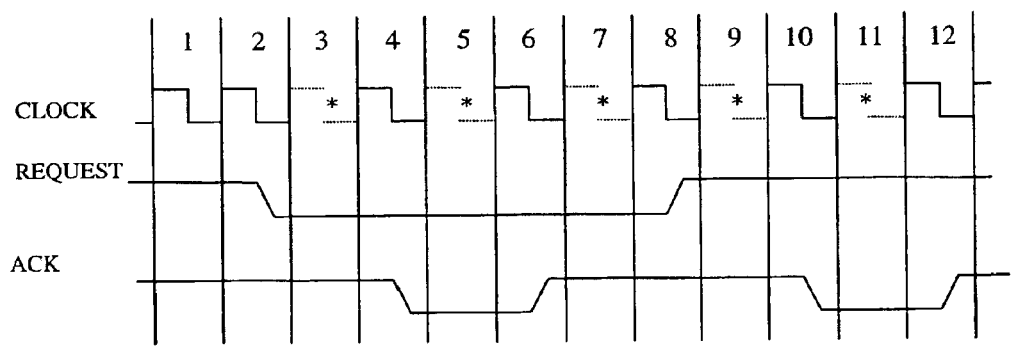
FIG. 3 is a timing diagram illustrating the arbitration protocol between the master and slave arbiters illustrated in FIG. 2.

FIG. 2 is a detailed functional diagram of arbiters 26 and 46 in accordance with the present invention, and FIG. 3 is a timing diagram illustrating a four-phase handshake between master arbiter 26 and slave arbiter 46 in accordance with a preferred embodiment of the present invention. As shown in FIG. 2, if master arbiter 26 awards ownership of peripheral bus 62 to the pair comprising master device 22 and controller 24, a request from master device 22 operates acknowledge device 74 so that it does not de-assert any acknowledge signal for arbiter 46. This assures that the ownership signal from device 72 will remain asserted for the duration of any transaction between master device 22 and memory 60. The physical form of arbiters 26 and 46 is not material to the present invention, and arbiters 26 and 46 may take on any of several physical forms, including states of signals in the chips, hardware such as flip-flops and registers and the like, and combinations of both.

In FIG. 3, all signals are normally high when de-asserted and are low when asserted. Clock signals are shown in FIG. 3 and are assumed to be phase and frequency synchronous for clocks 28 and 48 (FIG. 1). The clocks may be different, in which case adjustment for clock differences may be necessary.

Clock cycle 1 illustrates the condition of arbiters 26 and 46 prior to a request from master device 42. A request signal from master device 42 to request device 76 is high (de-asserted). Consequently, the request on line 64 is high (de-asserted) and the acknowledge signal from device 74 on line 66 is also high (de-asserted). If master device 42 desires to access peripheral bus 62, it issues a request signal to device 76 to assert a request via line 64 to device 78, shown in FIG. 3 at clock cycle 2. The request signal from device 76 is asserted until the transaction to be performed by master device 42 is completed. Request cycles 3 in FIG. 3 represents the period for arbiter 26 to receive the asserted request signal and an acknowledge signal is asserted (clock cycle 4).

If master device 22 is conducting a transaction with memory 60 the acknowledge signal is asserted for a period of time (cycles 5) until the transaction between master device 22 and peripheral device 60 is completed. At that time, the request signal from master device is de-asserted to acknowledge device 74 to de-assert the acknowledge signal (clock cycle 6).

De-assertion of the acknowledge signal operates ownership device 72 to de-assert the ownership signal to chip 20

(gates 30 and 32 and controller 24) and to operate ownership device 80 to assert an ownership signal to chip 40 (gates 50 and 52 and controller 44). Hence, at clock cycle 6 control of peripheral bus 62 is handed over from chip 20 to chip 40.

As shown at transaction cycles 7, master device 42 conducts its transaction with peripheral device 60 via bus 62 as heretofore described, continuing to assert its request signal to device 76 to maintain the acknowledge signal on line 66 de-asserted. Upon completion of the transaction, master device 42 de-asserts its request signal, thereby operating device 76 to de-assert its request signal to acknowledge device 74 (clock cycle 8). Cycles 9 represent the time required for arbiter 26 to operate device 74 to re-assert the acknowledge signal on line 66 (clock cycle 10). As a result, ownership device 80 is operated during reset cycles 11 to de-assert ownership signals to chip 40, thereby giving up ownership of peripheral bus 62. Cycles 11 are long enough to permit receipt and operation by device 80. Thereupon, at clock cycle 12, device 74 de-asserts the acknowledge signal, thereby operating ownership device 72 to assert its ownership signal to chip 20. The protocol ends at clock cycle 12, with the de-assertion of acknowledge signal from device 74. In the preferred form of the arbitration scheme, ownership device 72 remains in a de-asserted ownership state, and responds to a request signal from master device 22 to re-assert ownership. Alternatively, device 72 could be operated to assert ownership to chip 20 upon de-assertion of the second acknowledge signal.

Upon completion of the protocol, master device 22 on master chip 20 can perform transactions with memory 60 in the normal manner.

One feature of the invention is that the number of request cycles 3 represents a timeout value, representing a maximum time necessary to receive an asserted acknowledge signal from master arbiter 26. If that timeout period expires before receiving the de-asserted acknowledge signal, slave arbiter 46 can presume that the master chip is malfunctioned ("dead"), whereupon slave arbiter 46 device 80 operates to assert an ownership signal to chip 40 and assume ownership of the peripheral bus. Another feature is that if master arbiter 26 fails to acknowledge receipt of the de-asserted request signal within a delay period established by cycles 9, the ownership asserted by arbiter 46 is de-asserted, placing memory controller 44 to an idle (high-impedance) state and slave arbiter may serve as a master arbiter.

The preferred arbitration scheme described herein is an efficient system and is easily expanded to accommodate any reasonable number of slave chips. Consequently, the number of master/controller pairs is not limited to two. The arbitration protocol of the present invention does not require an external arbiter, nor the use of additional communication bits to identify the functionality of the chips. While the arbitration technique advances the slave chip to its next state if the request signal times out without receipt of an acknowledge signal (clock cycles 3), instead arbiter 46 could be configured to assume the duties of the master arbiter, thereby reducing latency of future transactions by master device 42.

Although the present invention has been described with reference to preferred embodiments, workers skilled in the art will recognize that changes may be made in form and detail without departing from the spirit and scope of the invention.

What is claimed is:

1. A process of operating first and second arbiters to arbitrate ownership of a bus coupling a controlled device to first and second circuits, wherein the first circuit comprises a first master device and first controller and the second circuit comprises a second master device and second controller, the process including steps of:
   a) operating the first arbiter to assert a first ownership signal to the first circuit so that the first controller may conduct transactions between the first master device and the controlled device;
   b) operating the second arbiter to assert a request signal in response to a condition that the second master device is ready to conduct a data transfer transaction with the controlled device;
   c) operating the first arbiter in response to the asserted request signal to assert a first acknowledge signal as long as the first ownership signal is asserted, the first arbiter de-asserting the first acknowledge signal after assertion of the first acknowledge signal and de-assertion of any first ownership signal;
   d) operating the second arbiter in response to a de-asserted first acknowledge signal to assert a second ownership signal to the second circuit so that the second controller may conduct transactions between the second master device and the controlled device; and
   e) operating the second arbiter in response to completion of a data transfer transaction between the second master device and the controlled device to de-assert the request and second ownership signals.

2. The process of claim 1, further including:
   f) operating the second arbiter to assert the second ownership signal in response to absence of assertion of the first acknowledge signal during a first period of time representing a timeout period of the first master device.

3. The process of claim 1, wherein the first acknowledge signal is asserted for a second predetermined time period representing a response delay of the arbiter and any period that the first ownership signal is asserted.

4. The process of claim 1, further including steps of:
   f) operating the first arbiter in response to de-assertion of the request signal to assert a second acknowledge signal; and
   g) operating the second controller to an idle state in response to absence of the second acknowledge signal for a third predetermined time period.

5. The process of claim 1, wherein the first circuit and first arbiter are on a first integrated circuit and the second circuit and second arbiter are on a second integrated circuit.

6. The process of claim 2, wherein the first acknowledge signal is asserted for a second predetermined time period representing a response delay of the second arbiter and any period that the first ownership signal is asserted.

7. The process of claim 3, wherein the first and second integrated circuits include respective clocks, each providing cyclic clock signals to the respective master device, controller and arbiter, and wherein the respective first and second time periods are identified by respective clock cycles.

8. The process of claim 6, wherein the first and second integrated circuits include respective clocks, each providing cyclic clock signals to the respective master device, controller and arbiter, and wherein the respective first and second time periods are identified by respective clock cycles.

9. Arbiter apparatus for arbitrating ownership of a bus coupling a controlled device to first and second circuits, wherein the first circuit comprises a first master device and first controller and the second circuit comprises a second master device and second controller, the arbiter apparatus comprising:

a first arbiter operable to assert a first ownership signal to the first circuit, the first circuit being responsive to the asserted first ownership signal to operate the first controller to conduct transactions between the first master device and the controlled device;

a second arbiter comprising:
  a request device responsive to a request from the second master device to assert a request signal, the request device being further responsive to completion of a data transfer transaction between the second master device and the controlled device to de-assert the request and second ownership signals, and
  an ownership device responsive to a de-asserted first acknowledge signal to assert a second ownership signal to the second circuit, the second circuit being responsive to the asserted second ownership signal to operate the second controller to conduct transactions between the second master device and the controlled device;

the first arbiter comprising:
  an acknowledge device responsive to the request signal to assert the first acknowledge signal and responsive to a de-asserted first ownership signal to de-assert the first acknowledge signal.

10. Apparatus of claim 9, wherein the ownership device is further responsive to the absence of assertion of the first acknowledge signal during the first period of time representing a timeout period of the first master device to assert the second ownership signal.

11. Apparatus of claim 9, wherein the acknowledge device asserts first acknowledge signal for a second predetermined time period representing a response delay of the second arbiter.

12. Apparatus of claim 9, wherein
  the acknowledge device is further responsive to de-assertion of the ready signal to assert a second acknowledge signal, and
  the ownership device is responsive to an absence of an asserted second acknowledge signal for a third predetermined time period to idle the second controller.

13. Apparatus of claim 9, wherein the first circuit and first arbiter are on a first integrated circuit and the second circuit and second arbiter are on a second integrated circuit.

14. Apparatus of claim 11, wherein the first and second integrated circuits include respective clocks, each providing cyclic clock signals to the respective master device, controller and arbiter, and wherein the respective first and second time periods are identified by respective clock cycles.

15. Apparatus of claim 13, wherein the ownership device is further responsive to the absence of assertion of the first acknowledge signal during the first period of time representing a timeout period of the first master device to assert the second ownership signal.

16. Apparatus of claim 13, wherein the acknowledge device asserts first acknowledge signal for a second predetermined time period representing a response delay of the second arbiter.

17. Apparatus of claim 16, wherein the first and second integrated circuits include respective clocks, each providing cyclic clock signals to the respective master device, controller and arbiter, and wherein the respective first and second time periods are identified by respective clock cycles.

18. Apparatus of claim 13, wherein
  the acknowledge device is further responsive to de-assertion of the ready signal to assert a second acknowledge signal, and
  the ownership device is responsive to an absence of an asserted second acknowledge signal for a third predetermined time period to idle the second controller.

* * * * *